Sept. 9, 1930.  J. J. FRANK  1,775,090
VALVE
Filed March 19, 1928

INVENTOR
JOHN J. FRANK
BY
Oscar T. DeWitt
ATTORNEY

Patented Sept. 9, 1930

1,775,090

UNITED STATES PATENT OFFICE

JOHN J. FRANK, OF PITTSFIELD, MASSACHUSETTS

VALVE

Application filed March 19, 1928. Serial No. 262,909.

The object, construction, and operation of my improved valve are herein set forth with sufficient clearness to enable those skilled in the art to which it appertains, to make and use the same.

My invention relates to an improvement in valves and particularly to a specially constructed valve adapted to effect a tight joint to prevent leakage of fluids and gases, such as air, steam, water, and especially oils when the valve is seated.

Valves as ordinarily made, comprise a metal seat upon which rests a disc. The disc is usually made of molded composition and is inserted in a container commonly known as a disc holder or clapper, and the disc is retained in the disc holder by means of a nut usually called the "disc nut." With valves of this nature there is nothing to prevent leakage thru the main members, and frequently leakage is experienced when the fluids are of exceptionally low viscosity. Valves are also made, comprising a phenolic condensation cementing material covered with a vulcanized rubber facing adhesively and permanently secured to the outer surface of the phenolic condensation cementing material, and with valves of this nature exposed to a high temperature a slow, partial vulcanizing takes place to such an extent that the disc adheres to the disc holder to such a degree which not infrequently results in damage to the disc holder or its entire loss.

In my invention I provide a tight valve, which preferably consists of a valve disc composed of phenolic condensation cementing material, and is so constructed that the phenolic composition seats against the valve plate and is connected thereto, with no projecting edges or openings therein, thus providing a valve disc that is substantially waterproof and impervious to oil or moisture and unaffected by high temperature. My invention further consists in the novel manner of mounting the phenolic composition on the valve plate so that no leakage can occur therethru.

In the accompanying drawings I show several illustrative embodiments of this invention.

Figure 1:
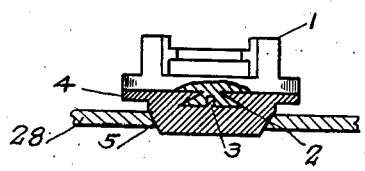
Figure 1 is a transverse section thru a form of valve.

As indicated in Figure 1 the valve plate or support 1 may consist of any desired metal, and has a conical extension 2 depending therefrom with the base of the cone provided with a slot 3 to facilitate the union of the phenolic condensating material to form the body 5 of the valve. This particular valve is constructed with a flange 4 which extends to the perimeter of the valve plate 1. The phenolic composition is applied in a plastic state so that it may be molded under pressure around the conical extension 2 and form the body 5 and flange 4 of the valve of some such shape as indicated, which valve body and flange are held in contact with the valve plate 1. This form of valve is well adapted for use on small valves, as it is substantially leakage proof, and the pressure on the body of the valve bears directly on the valve plate thereby providing a substantial and uniform support for the valve body and flange. A valve seat 28 is shown in cooperation with the valve.

Figure 2:
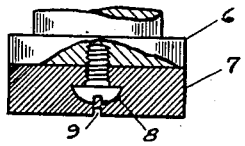
Figure 2 is a sectional view thru another form of valve with attaching means.

In Figure 2 another arrangement is shown in which the phenolic composition is molded into the flat shaped valve 7 and around the screw 8 which engages in the valve plate 6. In this manner I have provided a valve disc that is substantially oil and moisture proof, and can be applied to the valve plate 6 or removed to replace when desired by the insertion and operation of an ordinary screw driver within the slot 9.

Figure 3:
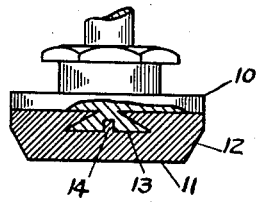
Figure 3 is a transverse section thru another form of valve.

Another arrangement is shown in Figure 3 in which the phenolic composition which forms the body of the valve 12 is molded in a plastic state in a similar manner to Figure 1 around the conical extension 13 which is also provided with a slot 14 to facilitate the union of the phenolic condensation material to form the body of the valve 12. The valve 12 is adapted for use on large valves and has a large face area 11, and the pressure on the valve 12 bears directly on the surface of the valve plate 10 thereby providing a substantial and uniform support for the valve 12.

Figure 4:
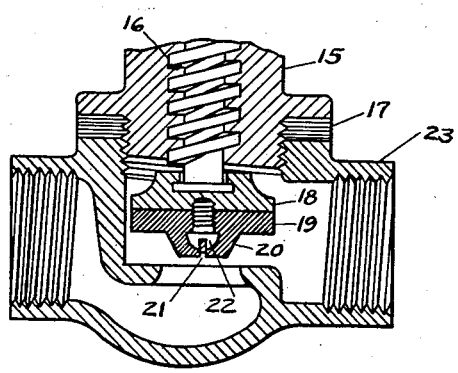
Figure 4 is a sectional view thru another form of valve provided with attaching means.

Figure 4 shows another arrangement of an ordinary valve with the valve casing 23 and valve bonnet 15 with a gasket 17 interposed between the valve bonnet and the casing in which operates the screw 16 connected to the valve plate 18. The valve 19 with a conical extension 20, is composed of phenolic composition which composition is molded around the screw 22 which engages in the valve plate 18. The outer end of the conical extension 20 is provided with a slot 21 to provide the means, by insertion and operation of an ordinary screw driver within the slot 21, to remove or replace the valve 19 when desired. It will be seen from the drawing that by this construction I have provided a valve that is substantially oil and moisture proof.

Figure 5:
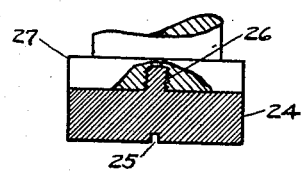
Figure 5 is a sectional view thru another form of valve with attaching means.

Figure 5 shows another arrangement of a valve 24 which may be composed of metal or phenolic condensation material with the perimeter of the valve flush with the valve plate. A threaded central portion extends from the valve 24 to provide the engaging means of the valve with the valve plate. The valve 24 is also provided with a slot 25 to provide the means whereby the valve 24 may be removed or secured to the valve plate 25.

What I claim is:

1. A valve comprising a metallic valve plate, a valve with the perimeter of the valve flush with the valve plate and composed of phenolic condensation material with engaging means imbedded therein to attach the valve to the valve plate, and said valve bearing directly against the valve plate to prevent leakage from the valve plate through the valve.

2. A valve comprising a metallic valve plate, a conical shaped valve with a flange flush with the perimeter of the valve plate and composed of phenolic condensation material with engaging means imbedded therein to attach the valve to the valve plate, and said valve bearing directly against the valve plate to prevent leakage from the valve through the valve.

3. A valve comprising a metallic valve plate, a valve composed of phenolic condensation material with the perimeter of the valve flush with the valve plate, a central threaded portion extending from the valve to provide means to attach the valve to the valve plate, said valve bearing directly against the valve plate to prevent leakage from the valve plate through the valve.

In testimony whereof I affix my signature.

JOHN J. FRANK.